(12) United States Patent
Woods

(10) Patent No.: US 7,753,157 B1
(45) Date of Patent: Jul. 13, 2010

(54) MOTORCYCLE WITH PEDALS

(76) Inventor: Cameron Woods, 3201A, Center_St., Soquel, CA (US) 95073

( * ) Notice: Subject to any disclaimer, the term of this patent is extended or adjusted under 35 U.S.C. 154(b) by 0 days.

(21) Appl. No.: 12/378,556

(22) Filed: Feb. 17, 2009

(51) Int. Cl.
*B62K 11/00* (2006.01)
*B62M 23/02* (2006.01)

(52) U.S. Cl. .................. 180/207; 180/205; 180/227

(58) Field of Classification Search ............ 180/205, 180/206, 207, 220, 227; 280/284
See application file for complete search history.

(56) References Cited

U.S. PATENT DOCUMENTS

| | | | | |
|---|---|---|---|---|
| 3,269,480 A | * | 8/1966 | Kirby | .................. 180/225 |
| 4,267,898 A | | 5/1981 | Wheaton | |
| 4,413,692 A | | 11/1983 | Clifft | |
| 4,541,500 A | * | 9/1985 | Gelhard | .................. 180/205 |
| 5,024,286 A | | 6/1991 | Lean | |
| 5,242,028 A | | 9/1993 | Murphy | |
| 5,474,318 A | | 12/1995 | Castellano | |
| 5,941,332 A | | 8/1999 | Dimick | |
| 6,039,137 A | * | 3/2000 | Schless | .................. 180/220 |
| 6,155,369 A | | 12/2000 | Whittaker | |
| 6,321,863 B1 | | 11/2001 | Vanjani | |
| 6,564,894 B1 | * | 5/2003 | Ho | .................. 180/228 |
| 6,976,551 B2 | | 12/2005 | Spanski | |
| 7,040,441 B1 | * | 5/2006 | Karaba | .................. 180/207 |
| 7,207,584 B2 | | 4/2007 | Forderhase | |
| 7,314,109 B2 | | 1/2008 | Holland | |
| 7,461,714 B2 | * | 12/2008 | Holland | .................. 180/205 |

* cited by examiner

*Primary Examiner*—Anne Marie M Boehler
(74) *Attorney, Agent, or Firm*—Patent Jurist; Georgiy L. Khayet

(57) ABSTRACT

The present invention presents a motorcycle with pedals comprising a light tough metal alloy or composite frame with a swing arm pivoting about a jack shaft to the rear axle, the jack shaft turning two sprockets and a free wheel with another sprocket at the pedal, a sprocket aligned on the jack shaft for power transmission from the engine and a sprocket aligned on the jack shaft for power transmission to the rear wheel sprocket, two pedals, one on each side of the frame, coupled to an adjustable length crank spindle, whereby pedal power or engine power or both concurrently can be used to provide motorcycle propulsion.

8 Claims, 4 Drawing Sheets

MOTORCYCLE WITH PEDALS

BACKGROUND

Field of the Invention

The present invention generally relates to mopeds and specifically to the design or modification of a motorcycle to also have pedals for hybrid vehicle.

The general area of mopeds is not new. Kits for the conversion from a bicycle to a motorized bicycle abound. There are currently many kits for modifying a bicycle frame to work with the addition of a small engine for motorized propulsion in tandem with pedal propulsion. In addition Mopeds, a motorized pedal vehicle have been and continue to command a small vehicle market.

The typical motorized bicycle or moped has pedals and a motor. This is the defining characteristic of the moped or motorized bicycle. The current art typically have a gear or chain/belt mechanism to transfer power from the motor to the front or rear wheel. These typically have another gear or chain/belt mechanism to transfer power from the pedal to the rear wheel. Most bicycle frames are inadequate for carrying gas motors since they are not originally designed for the motorized power, but for pedal power.

Some bicycle drive systems use a standard freewheel and left-crank drive with an auxiliary power system for a bicycle having a motor attached to the bicycle flame by thin clamps. Power is delivered on demand via a sprocket driving a single freewheel attached to a modified left crank. The gearbox may be attached to the frame by means of a quick-release system. A bushing may be used instead of a modified as a means of mounting the freewheel to the crank axle. To prevent accidental simultaneous braking and triggering, triggering the system is accomplished by placing the trigger switch so that the rider's fingers must disengage the brake in order to engage the motor. Accidental triggering may be prevented by placing a trigger switch on each handle and wiring them in series so that both switches must be engaged to obtain power.

In some models the pedal power is transferred to a crank sprocket that transfers torque to the rear wheel via chain/belt and a second chain/belt on the other side of the rear wheel transmits torque from the engine. In these, the two sources of power, engine and pedal, impose an inefficiency in power transmission to the wheel along with being overly complex.

Another motorized vehicle is disclosed as consisting of a standard bicycle frame or modified bicycle frame, a tricycle frame, a go-cart frame, and a paddle wheel boat frame all with the gear box power control system installed on a gasoline four cycle engine. This vehicle is driven by a gear box power control system consisting of a centrifugal clutch with integral bell housing drive, a gear train for speed reduction and torque enhancement, an output jackshaft with an engaging system to disengage and engage engine power to a primary drive sprocket for chain operation. The engagement and disengagement of engine power is done by an integral engager remotely controlled by steel cable and hand lever. Moreover, engaging the power controls to a motorized bike provides no coupling of the pedal powered crank to a jack shaft.

One conversion kit provides a power-assist system and method for bicycles by which the bicycle can be operated in various modes. There is a pedal-alone mode, a power-assist mode, a combined pedaling and power-assist mode, and a coasting mode. An overriding clutch is positioned between the pedal section and the sprocket, and a second overriding clutch is positioned between a speed reducing gear section, driven by a motor, and a power-assist shaft located in the crank housing. But such a configuration must have a sprocket section having a chain-and-sprocket drive connection to the drive wheel.

Another kit converting a conventional bicycle to motorized drive uses an engine supporting frame assembly positioned above the rear wheel of the bicycle, and maintained in position by attachment to existing frame members of the bicycle. Driving power is imparted from the engine to the driven wheel of the bicycle through a power train including a driven pulley which is attached to the bicycle wheel through a clamp assembly including two clamp plates engaging the hub of the bicycle wheel. This is somewhat cumbersome and not well used.

Recently electrically powered vehicles have been included with a frame mounted motor connected to pedals and to a rear driven wheel through an intermediate jackshaft. The motor is connected to the jackshaft through a chain or belt. The pedals are connected to the jackshaft through a chain or belt and a jackshaft-pedal freewheel which allows the pedals to drive the jackshaft, but prevents the jackshaft from driving the pedal. The jackshaft is connected to the driven wheel through another chain or belt, and a second freewheel allows the jackshaft to drive the driven wheel but prevents the driven wheel from driving the jackshaft using the same chain or belt. Another chain or belt may additionally connect the driven wheel to the jackshaft through a third freewheel to recharge batteries during braking or while coasting downhill.

The electric powered vehicle, is not a gas powered hybrid and are still constrained by battery limitations. Moreover, power coupling and gear shifting present problems unique to the electric motorcycle. Hence electric powered bicycles still have range limitations but are a solutions in some markets.

In most bike conversions, the rear wheel is rigidly constrained to the bike frame. This rigid design prevents pivoting about the rear wheel axis which prevents alternate stretching—loosening tension on the chain. Most motorized bicycle conversion kits as shown appear to rigidly connect the rear wheel chain/belt axis to the power shaft or jack shaft. While this may work with rigid frame bicycles this configuration does not work for a full suspension motorized bicycles.

Another electrically powered bicycle includes a hub motor, which is mounted to the bicycle frame by its axle. A drive sprocket mounted to the outer case of motor is engaged by a chain to the sprocket on a multi-speed hub on the rear wheel, so that when the motor turns, it drives the wheel. A freewheel, also mounted to the outer case of motor, is engaged by a chain to the large sprocket on the pedal crank, such that when the motor is operating, it does not turn the pedal sprocket. When the pedals and the motor are both operating and the sprocket on the freewheel is rotated as fast as the motor, the pedals can drive the motor, and consequently, propel the bicycle. An additional driven sprocket is mounted to the motor case and an additional freewheel is mounted to the multi-speed hub, and both are connected by a third chain so that when the bicycle is coasting (i.e., the motor is not driving the rear wheel, the rear wheel will drive the motor to provide downhill, regenerative braking capability.

What is needed are motorized pedal vehicles that have more than a 40 mile refueling cycle and refueling that does not require more than 5 minutes.

Mopeds are strictly paved road transportation vehicles, are generally underpowered, and cannot take on steep terrains. Off-road or rough road travel vehicles still need an alternate source of power when they are out of fuel or otherwise power dead. Converted motorized bicycles suffer from the same problem. Rough or steep terrain are impediments to using a motorized vehicle with pedals. What is needed are vehicles that are stronger framed yet have the pedal power option for the reasons cited above. What is needed are more rugged hybrid motorized vehicles with pedal power as an auxiliary power for emergencies, in the event that the power system fails or fuel is exhausted, and some other means of locomotion is necessary.

Most current motorcycles are too heavy framed or have too stiff a frame suspension to provide a pedal power option. Moreover, most motorized bike kits are for rigid frame bicycles only, because they cannot position the engine without interference with the crank-peddle circumscribed volume. Furthermore, most motorcycles have large motors with gear boxes extending out too far for pedal free unobstructed motion. But if a motorcycle could be modified in such a way to be lighter framed yet strong enough to sport a gas motor that did not interfere with pedal motion, then such a motorcycle with pedals would fill a yet unfed need.

SUMMARY

The present invention discloses a motorcycle with pedals comprising a frame with a swing arm extending from a frame pivot shaft to the rear axle, the swing arm pivot shaft is a jack shaft, the jack shaft turning two sprockets and a free wheel sprocket at the pedal sprocket, a sprocket aligned on the jack shaft for power transmission from the engine and a sprocket aligned on the jack shaft for power transmission to the rear wheel sprocket, a shock spring from the swing arm to the frame, to provide swing arm flexure about the jack shaft axis from rear wheel road induced perturbations, two pedals, one on each side of the frame, coupled to a crank spindle via cranks from the pedals to the spindle, the crank spindle of sufficient length to extend the cranks and pedals out of engine lateral extension dimension, power transmission means from a crank spindle sprocket to an aligned free wheel sprocket coupled to the jack shaft, power transmission means from the engine to engine sprocket aligned jack shaft to engine sprocket, power transmission means from the jack shaft sprocket aligned with a rear wheel sprocket, whereby pedal power or engine power or both concurrently can be used to provide motorcycle propulsion.

BRIEF DESCRIPTION OF DRAWINGS

Specific embodiments of the invention will be described in detail with reference to the following figures.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

OBJECTS AND ADVANTAGES

The present invention discloses a motorcycle with a frame configuration designed to be used with pedals. An object of the invention is to provide a vehicle which is geared mostly for motoring, but having the capability of pedaling when required.

It is another object of the present invention to provide embodiments for off-the-shelf gas powered proven motorcycle engines on light and strong modern small motorcycle framed hybrid vehicles, because motorcycle engines are too wide for a bicycle frame.

It is yet another object of the invention to provide a motorcycle so that the pedal power option is extended to near bicycle range distances.

It is another object of the invention to make a practical motorcycle for rough terrain but with pedals, applying a frame design with the motor positioned within the crank-pedal circumscribed volume, providing the lowest center of gravity without interference with the pedal motion.

It is another object of the invention to provide a full suspension, complete with a swing arm frame, something mopeds and motorized bicycle kits cannot currently offer.

It is another object of the invention to position the jack shaft on the swing arm pivot, so that the chain does not fatigue from loosening and tightening, as the swing arm rotates through its travel.

It is another object of the invention to provide motorized bicycles which can handle wider of-the-self motorcycle engines with gear boxes.

EMBODIMENTS OF THE INVENTION

Figure 1:
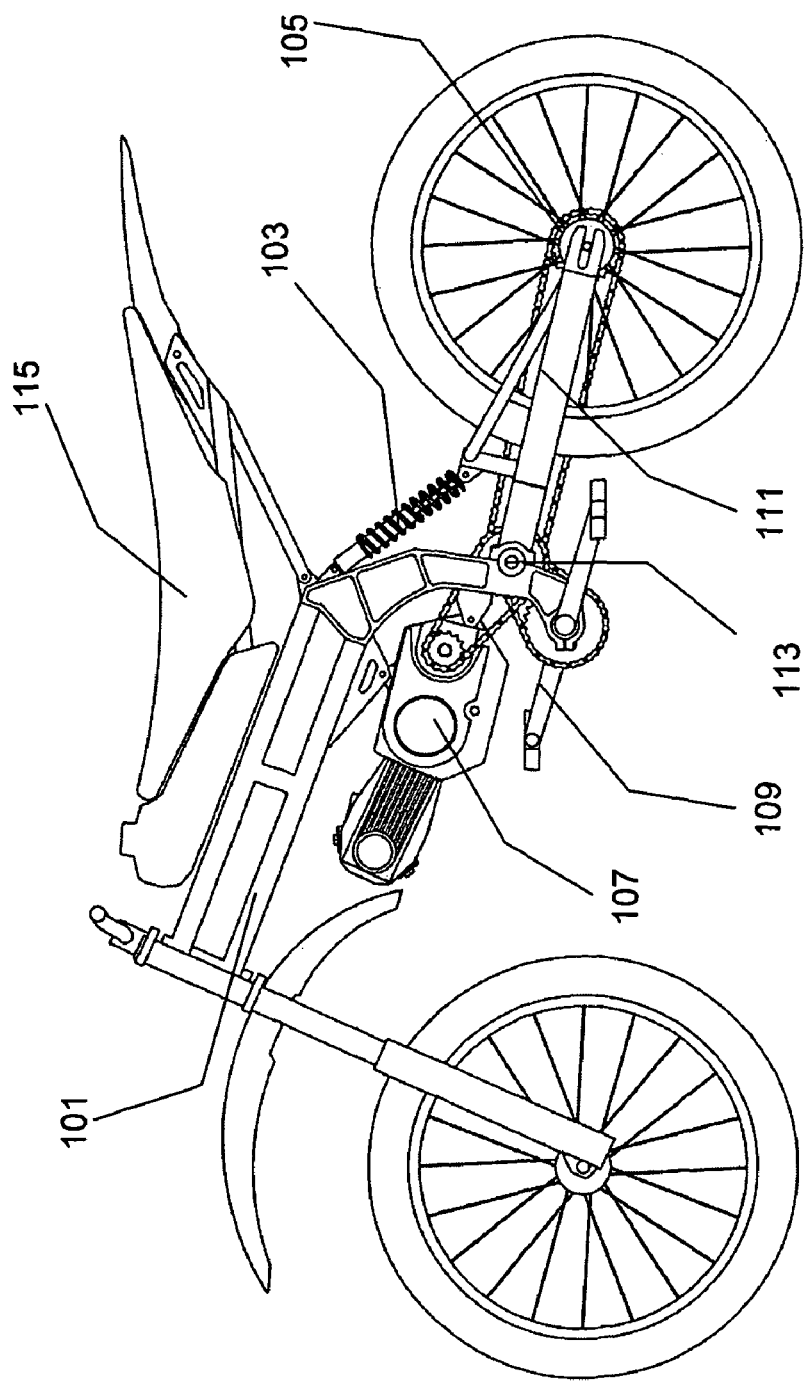
FIG. 1 is a side view of the pedal powered motorcycle illustrating the power linkages from the engine and the pedals according to an embodiment of the present invention.

FIG. 1 is a side view of the pedal powered motorcycle illustrating the power linkages from the engine and the pedals according to an embodiment of the present invention. Motorcycle frame 101 is of light aluminum alloy and designed for high strength minimum weight, with rear swing arm 111 shock absorber 103 coupled to the underside of seat 115, rear wheel sprocket 105 and chain inline with the swing arm 111 pivot 113, gas two or four stroke engine 107, and pedal crank 109. The position of the motor 107 within the frame 101 design allows placement of the jack shaft on the rear wheel side of the frame for inherent advantages from less pedal interference to vehicle center of gravity and overall bike balance.

Figure 2:
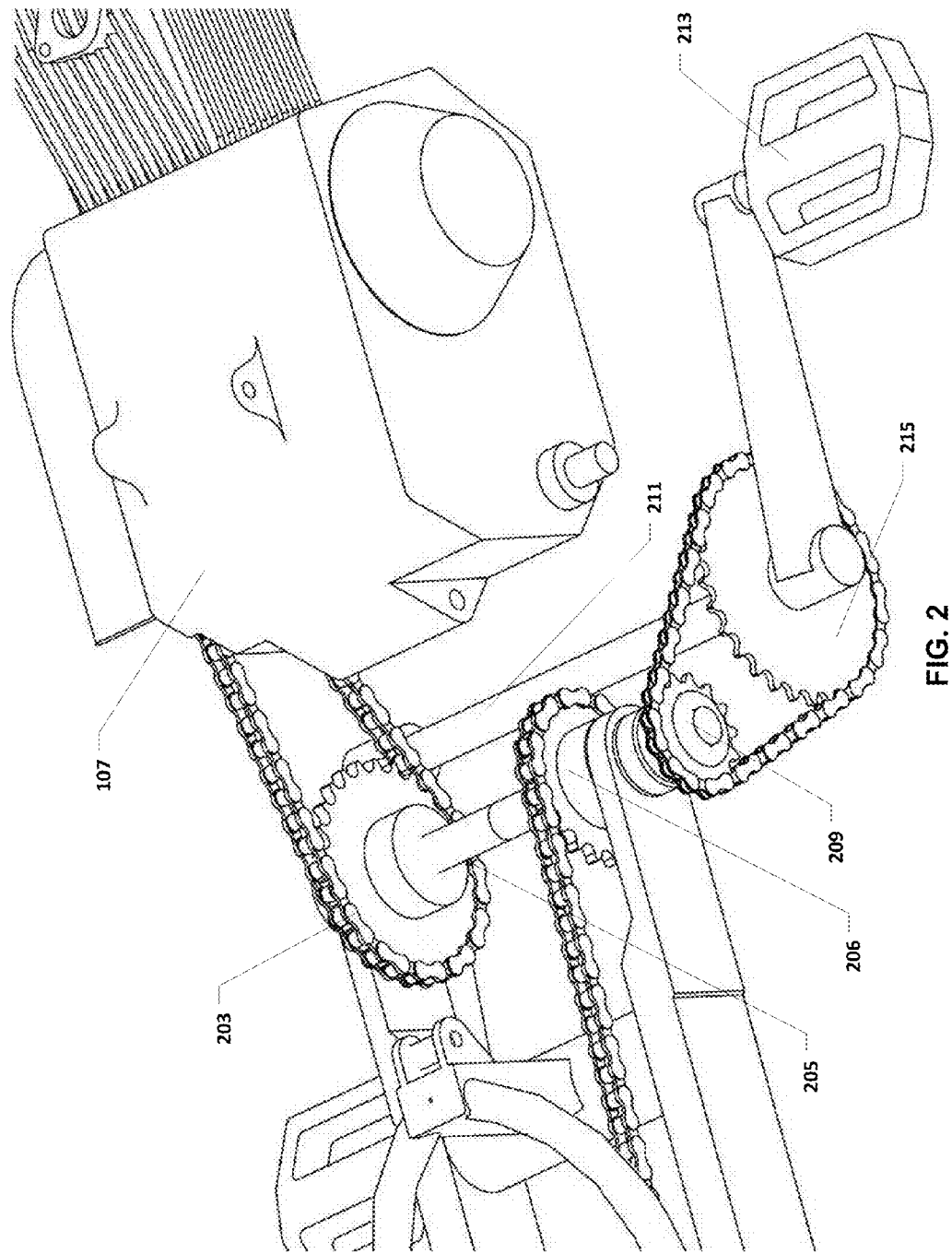
FIG. 2 shows perspective view of the power chain linkage integrating the engine and pedal power sources in accordance with an embodiment of the invention.

FIG. 2 shows perspective view of the power chain linkage integrating the engine and pedal power sources in accordance with an embodiment of the invention. The prefabricated motorcycle engine 107 with gear box transmits power via chain or belt from the motor sprocket or pulley to the jack shaft 205 sprocket 203 on the side opposite to the pedal freewheel sprocket 209. The jack shaft 205 is rigidly coupled to the rear wheel power sprocket 206 which in turn transmits power to the rear wheel sprocket by chain or belt. The pedal 213 transmits foot power via the crank to the crank spindle 211 or pedal shaft and pedal sprocket 215 which is coupled to an over-running clutch or freewheel 209 on the jack shaft 205. This configuration places the jack shaft 205 at the swing arm pivot so that swing arm rotation does not fatigue the chain or belt from loosening and tightening as the swing arm rotates through its travel, as would be the case if the power sprocket to the rear wheel were positioned on the frame at some other position. The over-running clutch provides for the rider to pedal when the motor revolutions are slower than the pedal provides, and hence the pedal power can be additive and concurrent with but not an interference with the engine power. This eliminates the need for any change over mechanism and adds the benefit of simplicity and lower costs.

Figure 3:
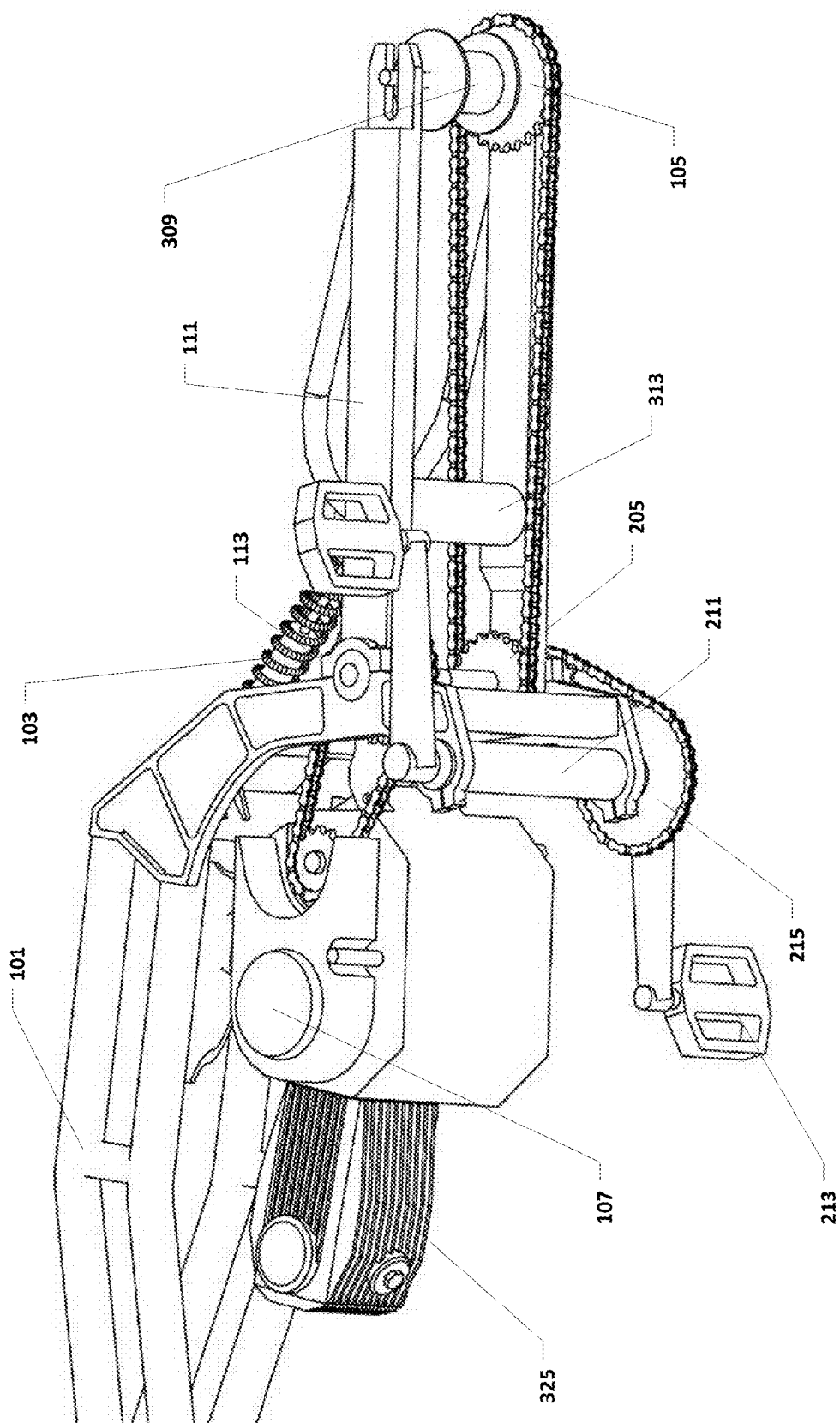
FIG. 3 shows bottom perspective view of the pedal integration into a motorcycle frame in accordance with an embodiment of the invention.

FIG. 3 shows bottom perspective view of the pedal integration into a motorcycle frame and power transmission from the engine and pedal sources in accordance with an embodiment of the invention.

A motor 107 and cylinder unit 325 is rigidly mounted to a frame 101 which has a swing arm 111 coupled to the main frame 101 body through a jack shaft 205 pivot 305 point. The motor and associated gear box is prefabricated preferably, are aspects of the invention that provide a pedal configuration that is adjustable to the motor dimensions and frame relative position. The swing arm 111 supports one spring shock end at swing arm cross bar 313 and the other end at the frame just below the seat. The distal end of the swing arm 111 is coupled with chain/belt to the rear wheel axle 309 which supports the rear wheel sprocket and chain 105 power transmission to the rear wheel. The crank spindle 211 is rigidly supported by the frame 101 just below the jack shaft 205 which receives pedal power transmission from the pedal sprocket 215 and ultimately from the riders pedal 213.

Figure 4:
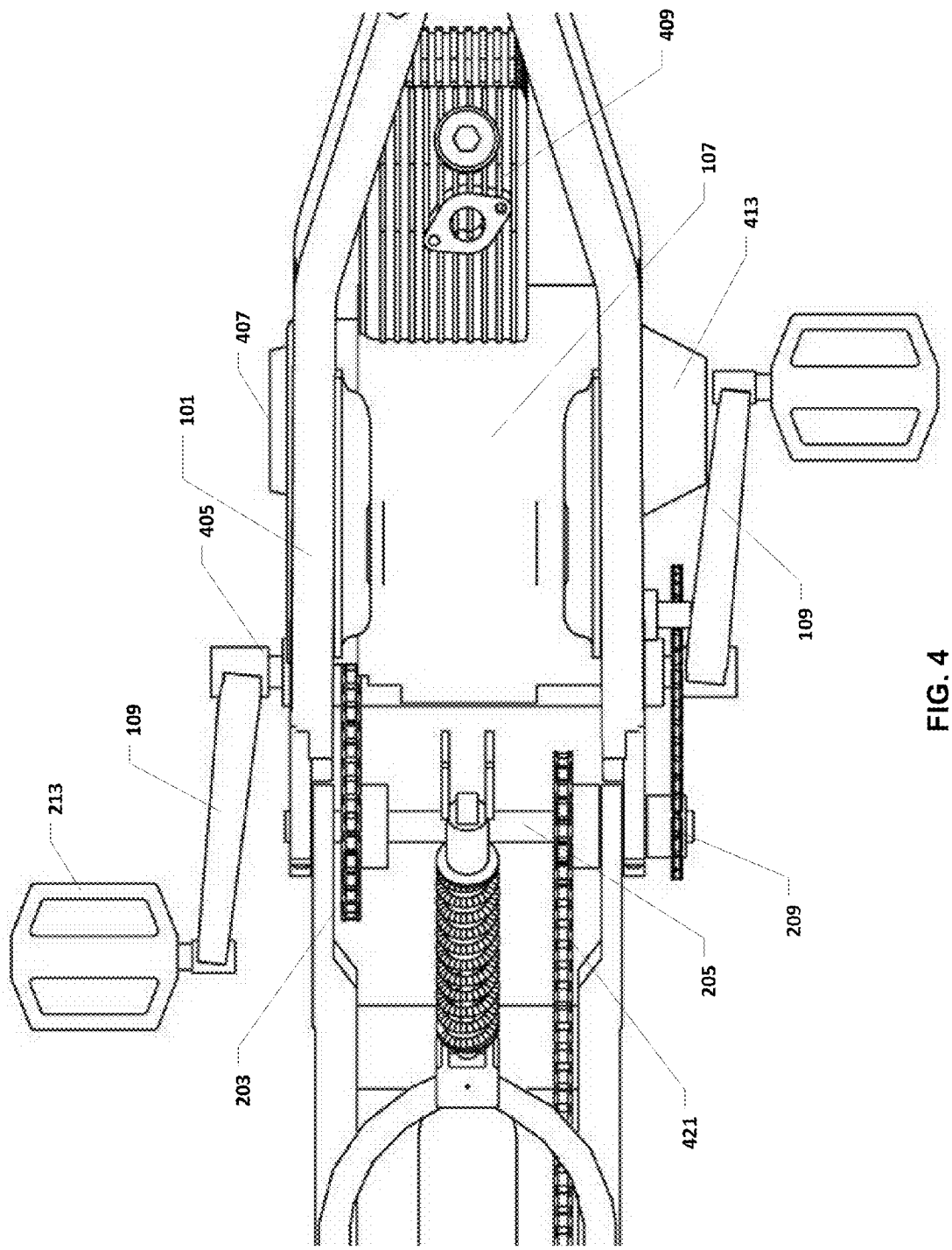
FIG. 4 shows top view of the power chain linkage integrating the engine and pedal power sources in accordance with an embodiment of the invention.

FIG. 4 shows top view of the power chain linkage integrating the engine and pedal power sources in accordance with an embodiment of the invention. A pedal 213 is operatively connected to the pedal crank 109 and then to the crank shaft or crank spindle on bearings 405 supported by the motorcycle frame 101. The engine 107 extends 407 413 laterally beyond the frame 101 and the pedals 213 including the pedal crank 109 must clear the engine extension 407 413 outside the frame 406 vertical plane. An aspect of the invention is to extend the crank spindle 211 such that clearance between the pedal crank 109 and the engine extends 407 413 exists for all positions. An extended crank spindle 211 will require that the pedal sprocket be aligned with the jack shaft 205 free-wheel 209. The jack shaft 205 transmits engine power via the engine cooperating jack shaft 205 sprocket 203 by chain or belt, which is transmitted to the rear wheel by the jack shaft rear wheel sprocket via chain 421 or belt the rear wheel axle sprocket, not shown.

Therefore, while the invention has been described with respect to a limited number of embodiments, those skilled in the art, having benefit of this invention, will appreciate that other embodiments can be devised which do not depart from the scope of the invention as disclosed herein. Other aspects of the invention will be apparent from the following description and the appended claims.

What is claimed is:

1. A motorcycle with pedals comprising:
a frame with a swing arm extending from a frame pivot shaft to a rear axle, the swing arm pivot shaft being positioned at a jack shaft,
the jack shaft turning two sprockets and a free wheel sprocket at the pedal,
a sprocket aligned on the jack shaft for power transmission from a prefabricated motorcycle engine and a
sprocket aligned on the jack shaft for power transmission to the rear wheel sprocket,
a shock spring from the swing arm to the frame, to provide swing arm flexure about the jack shaft axis from rear wheel road induced perturbations,
two pedals, one on each side of the frame, coupled to a crank spindle via cranks from the pedals to the spindle,
the crank spindle of sufficient length to extend the cranks and pedals out from interfering with engine lateral extension dimensions, allowing the prefabricated motorcycle engine to be positioned within a volume circumscribed by the cranks to provide the lowest center of gravity without interfering with motion of the pedals,
power transmission means from a crank spindle sprocket to an aligned free wheel sprocket coupled to the jack shaft,
power transmission means from the prefabricated motorcycle engine to a sprocket on the jack shaft aligned to engine sprocket,
power transmission means from the jack shaft sprocket aligned with a rear wheel sprocket,
whereby pedal power or prefabricated motorcycle engine power or both concurrently can be used to provide motorcycle propulsion.

2. The motorcycle with pedals as in claim 1, wherein the power transmission means can be by chain or belt.

3. The motorcycle with pedals as in claim 1, wherein the frame is made from light aluminum alloy or tough composite material.

4. The motorcycle with pedals as in claim 1, further comprising a seat and gas tank supported by the frame.

5. The motorcycle with pedals as in claim 1, further comprising frame dimensions and fittings for prefabricated motorcycle gas engines.

6. The motorcycle with pedals as in claim 1, further comprising extended crank spindle to accommodate a variety of engine dimensions.

7. The motorcycle with pedals as in claim 1, further comprising a swing arm full suspension frame.

8. The motorcycle with pedals as in claim 1, further comprising prefabricated motorcycle and bicycle parts.

* * * * *